United States Patent [19]

Zachmeier

[11] 4,295,534
[45] Oct. 20, 1981

[54] WELL BORING RIGS AND SPOIL HANDLING CONVEYOR APPARATUS THEREFOR

[76] Inventor: Thomas R. Zachmeier, Box 131, Mandan, N. Dak. 58554

[21] Appl. No.: 25,026

[22] Filed: Mar. 29, 1979

[51] Int. Cl.³ .......................................... E21B 21/06
[52] U.S. Cl. ........................................ 175/88; 175/66; 175/210; 198/817; 210/160
[58] Field of Search .................. 175/66, 209, 88, 210, 175/206; 210/160, 162, 400; 198/817

[56] References Cited

U.S. PATENT DOCUMENTS

| | | | |
|---|---|---|---|
| 1,585,461 | 5/1926 | Bracket | 210/160 |
| 2,576,283 | 11/1951 | Chaney | 175/66 |
| 2,813,617 | 11/1957 | Sheetz | 198/817 |
| 2,897,952 | 8/1959 | Buccicone | 198/817 |
| 2,941,783 | 6/1960 | Stinson | 175/66 |
| 3,952,858 | 4/1976 | Watts | 175/209 |
| 4,013,165 | 3/1977 | Bush | 198/817 |
| 4,138,340 | 2/1979 | Suzuki | 210/159 |

Primary Examiner—William F. Pate, III
Attorney, Agent, or Firm—Schroeder, Siegfried, Ryan, Vidas, Steffey & Arrett

[57] ABSTRACT

An improved spoil handling conveyor for well boring rigs wherein the conveyor working surface comprises a plurality of endless belts arranged side-by-side to allow the separation of spoil from drilling fluid by drainage therebetween.

8 Claims, 14 Drawing Figures

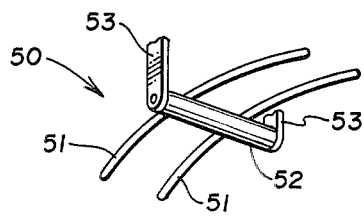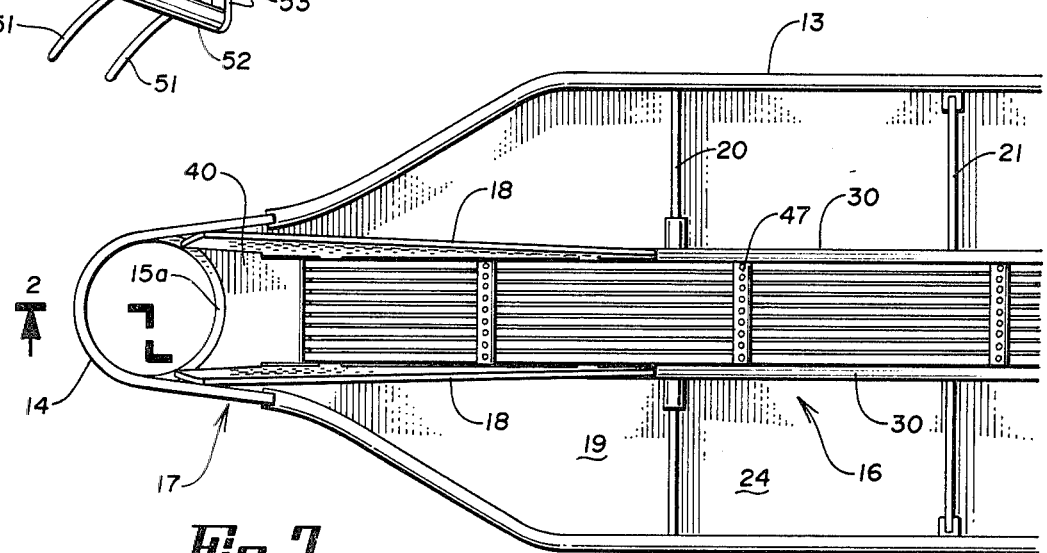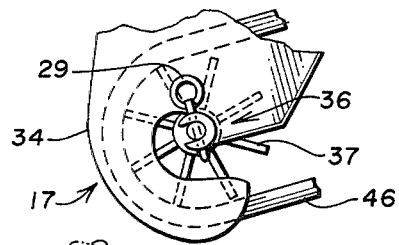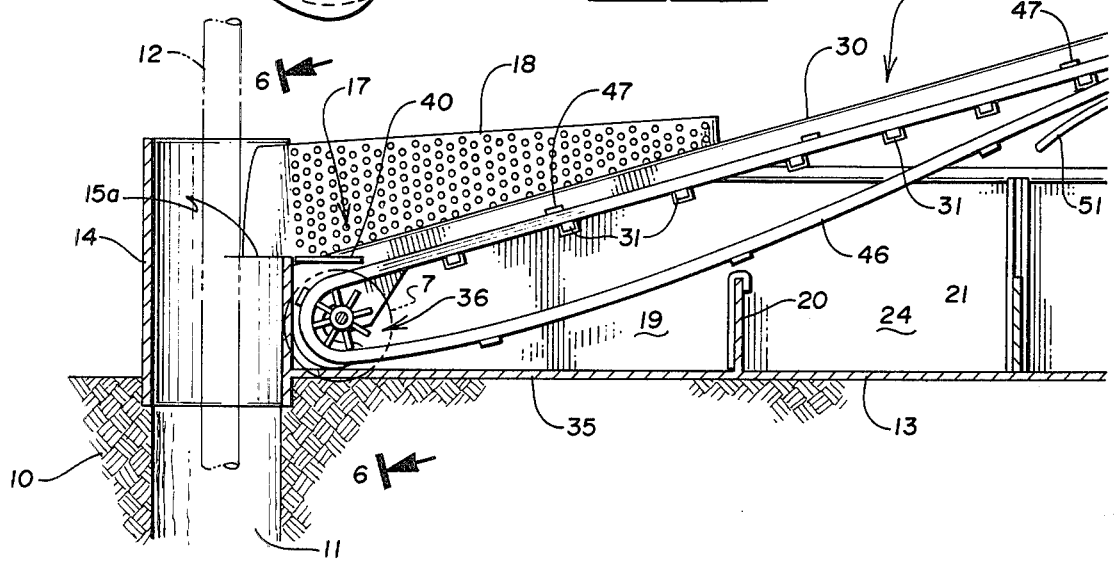

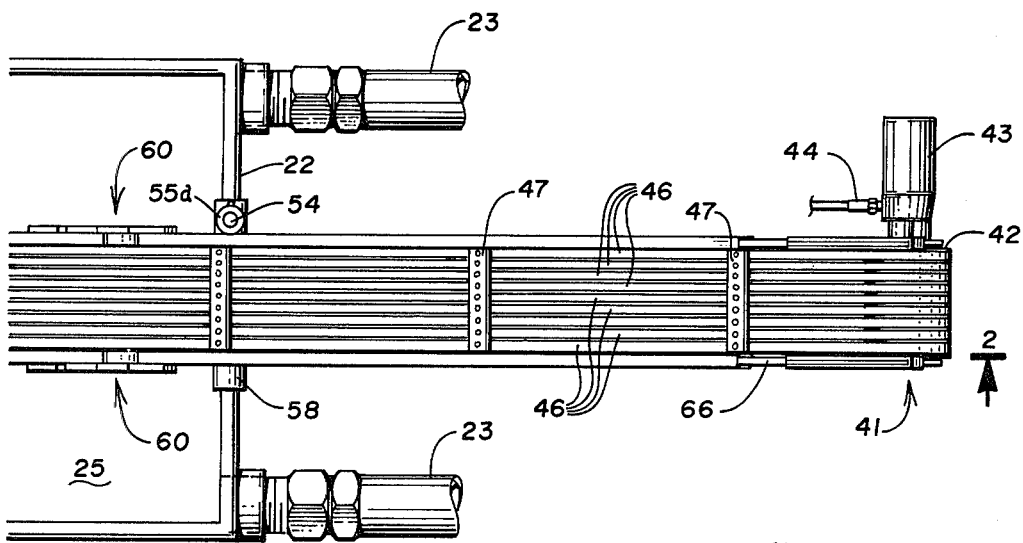
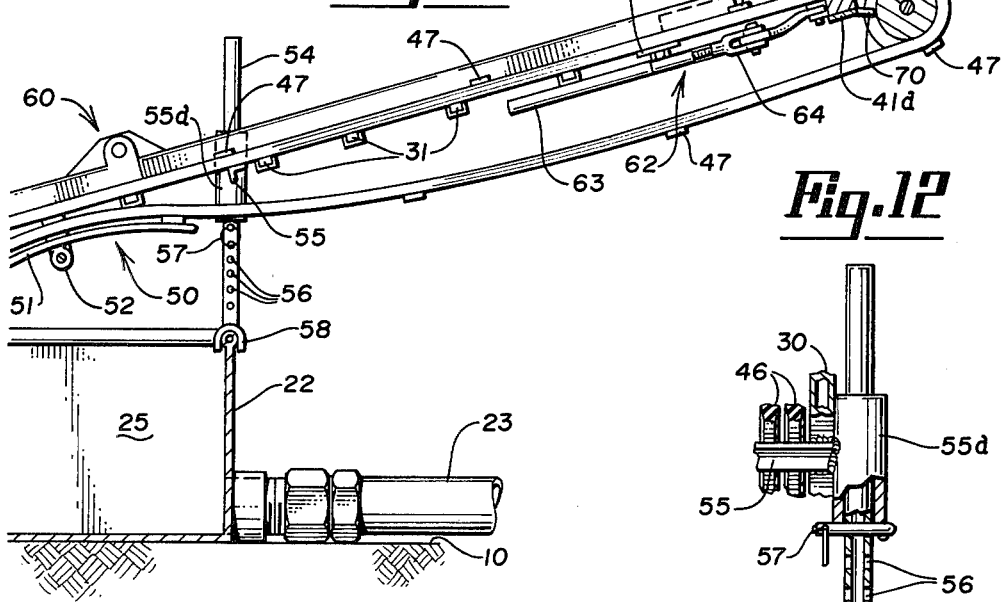
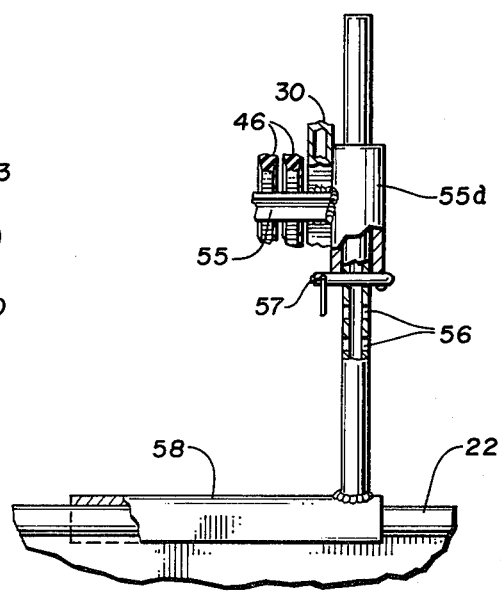

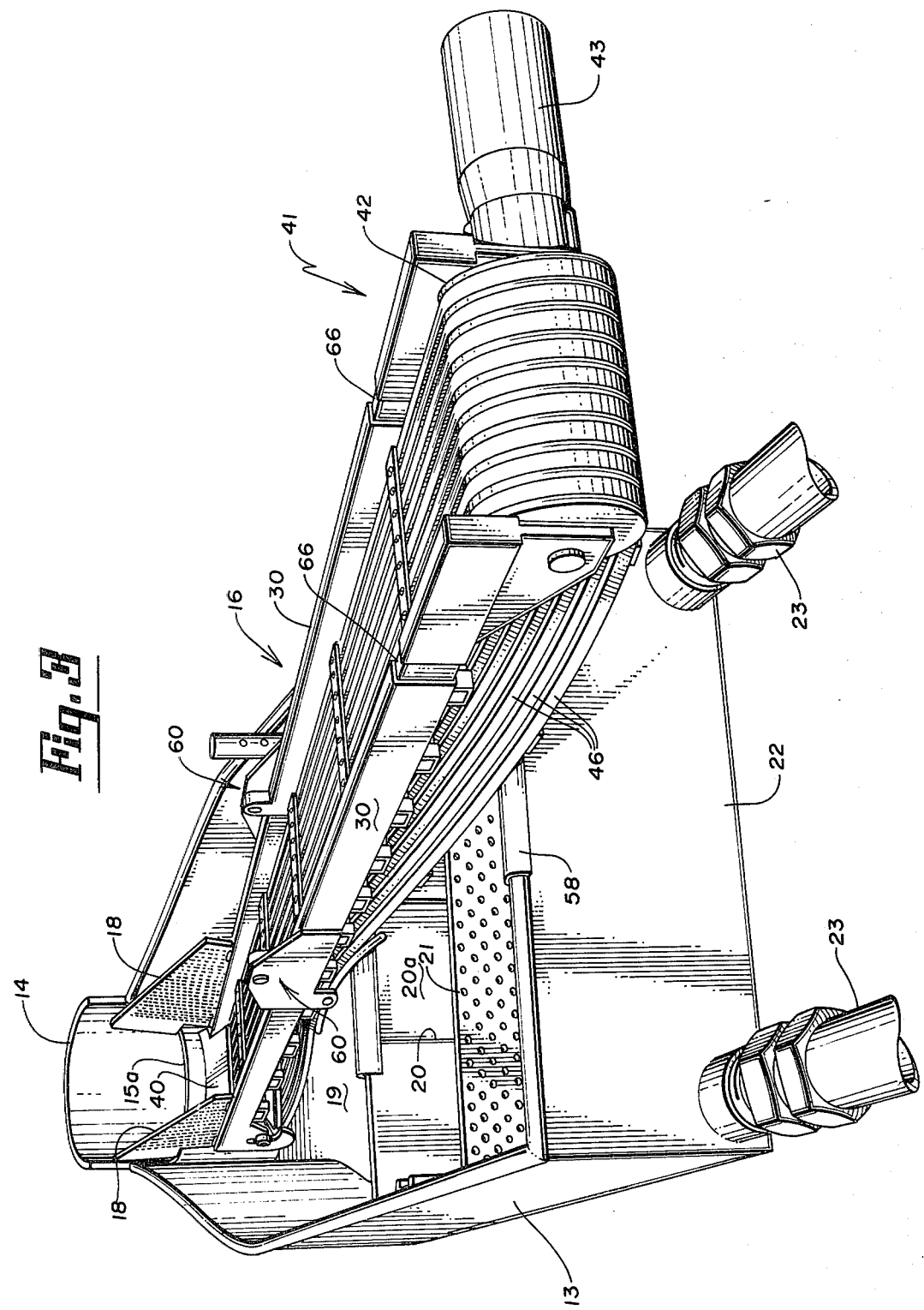

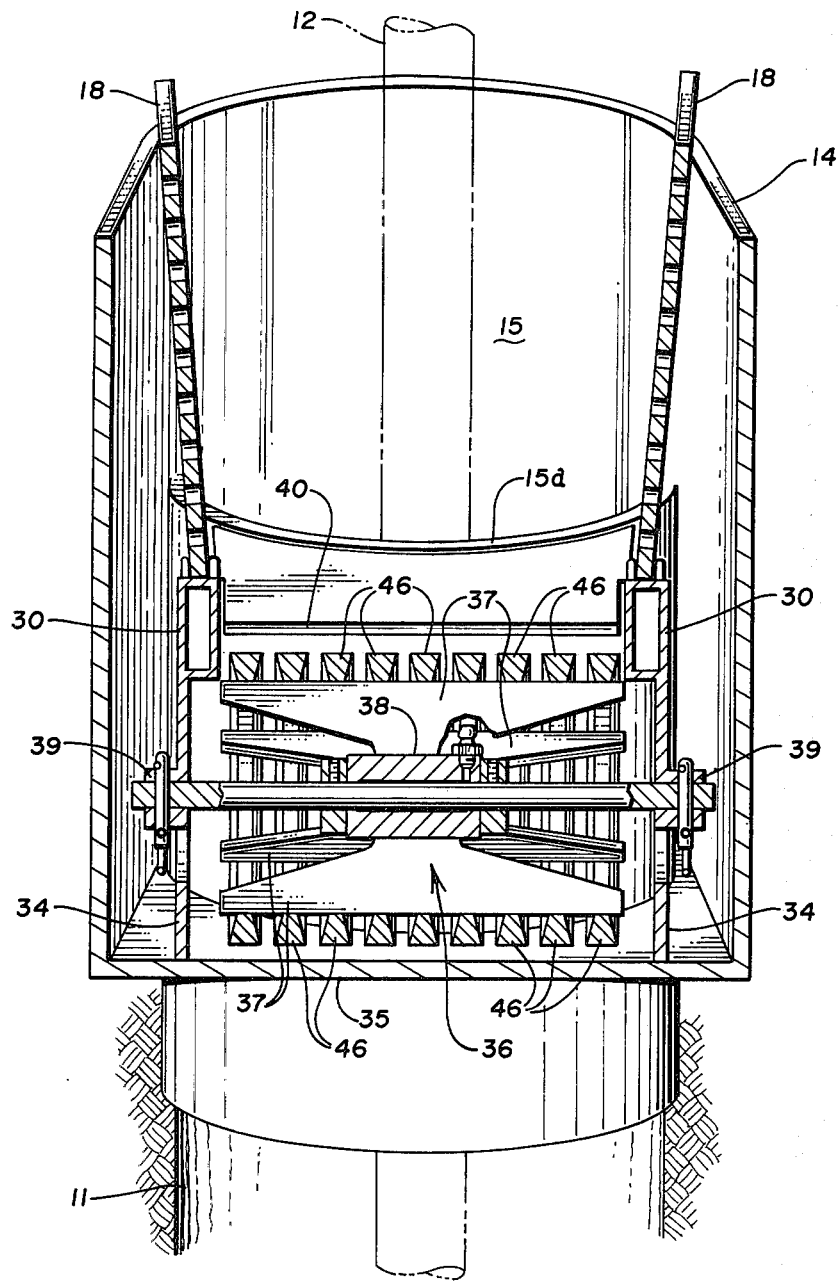
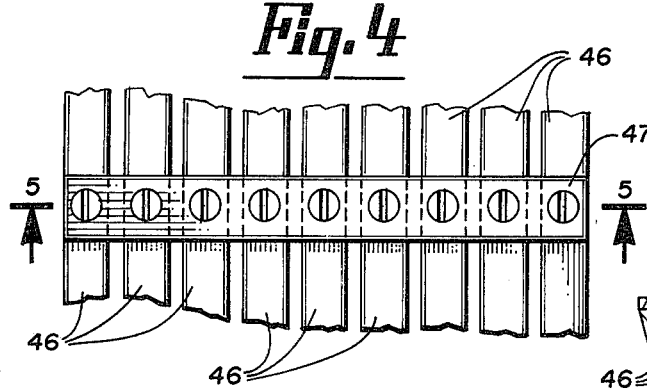
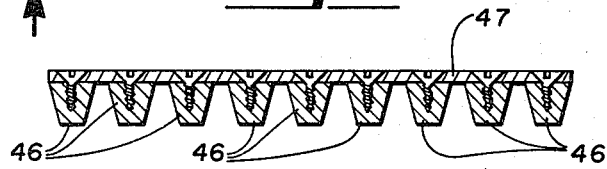

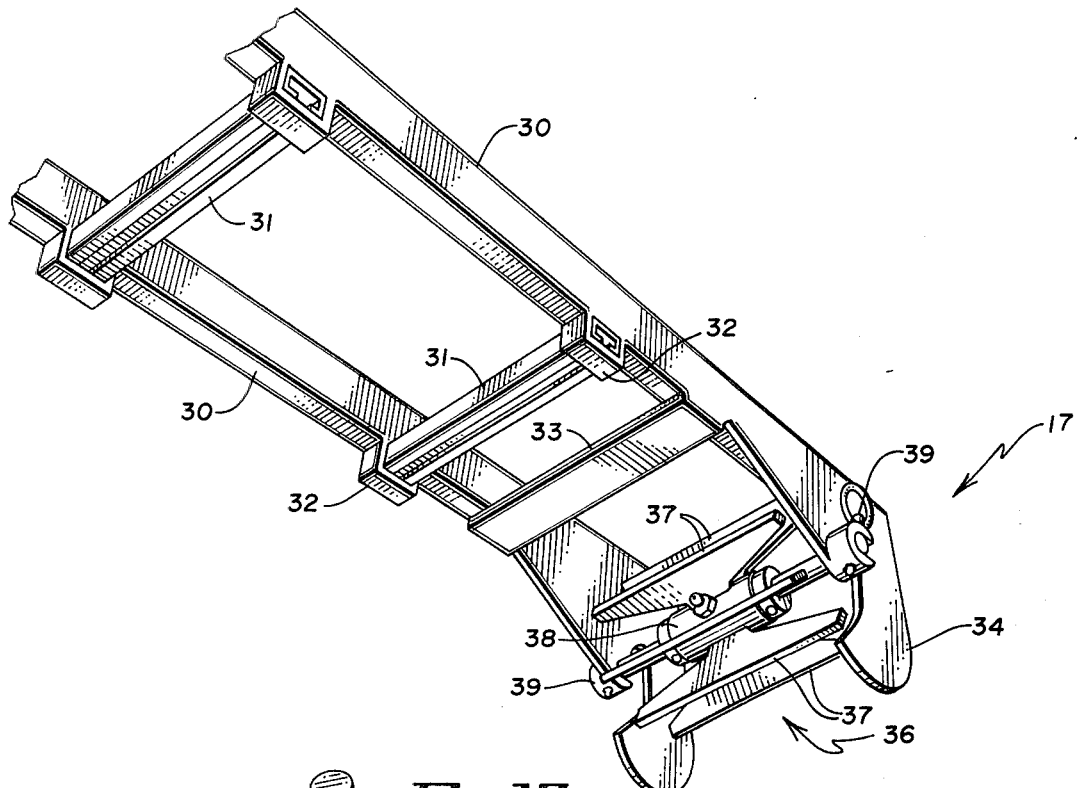
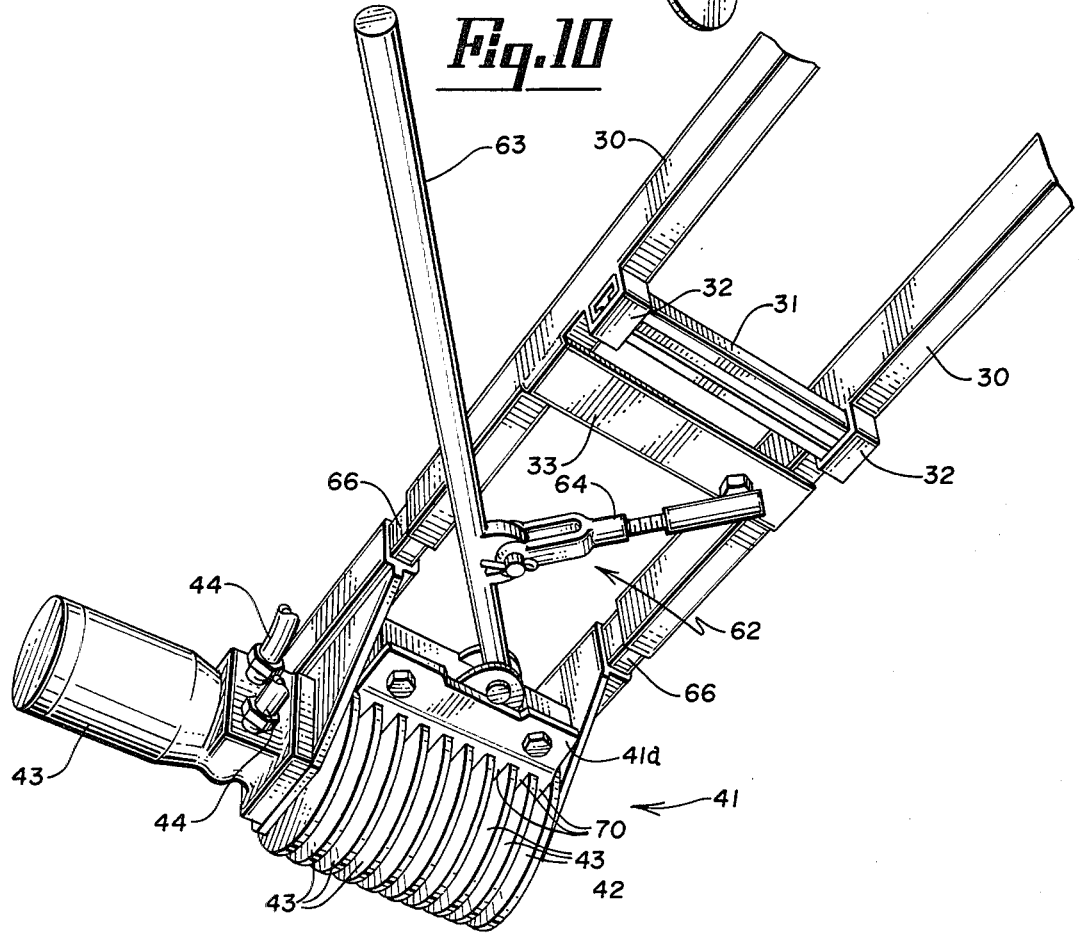

WELL BORING RIGS AND SPOIL HANDLING CONVEYOR APPARATUS THEREFOR

DESCRIPTION

Background of Prior Art

In forming a bore in the earth, it is necessary to remove the material at the bottom of the bore hole while forming the bore and convey it to the earth's surface. Various techniques have been developed for removing the material from the bore. This invention is particularly concerned with well drilling rigs wherein the spoil material formed in the bore hole is flushed out of it by the use of a drilling fluid, such as water, that is conveyed down into the hole through a drill pipe or the like and discharged at the rotary boring means cutting area to entrain the spoil material being formed by the boring means so that such material is conveyed back to the earth's surface with the drilling fluid.

This invention relates to a conveyor apparatus for separating spoil and drilling or flush fluid brought to the earth's surface during well drilling. More particularly, the invention relates to a conveyor apparatus for separating the spoil from the drilling fluid and conveying the spoil to a designated dumping area.

The invention also relates in a preferred form to such an apparatus which is assembled as a complete unit for mounting on motor vehicles such as trucks and which may be transported from place to place.

Such a rig will typically include a derrick, by means of which drill pipe, casing or drilling tools may be suspended, run into or withdrawn from the well bore, and a hydraulic lift or the like for feeding the drill pipe into the well bore. Such elements are well known and commonly used. However, in the drill rigs heretofore used there are certain disadvantages in the apparatus included with these elements for separating the spoil from the drilling fluid as it is discharged from the well hole being bored and for conveying the spoil after separation to a designated dumping area.

For example, in most rigs used heretofore, the rotary drill means has been surrounded by a settling tank into which the drilling fluid from the well hole being bored is discharged, carrying with it the spoil or tailings being cut in forming the bore. The tailings settle in the tank as the drilling fluid flows therethrough and is removed. After a large amount of spoil has been collected in the tank it is removed by a shovel and loaded into some means of conveyence for removal from the site.

The present invention has as an objective the provision of conveyor means specifically designed to substantially separate the spoil from the drilling fluid as it is discharged from the well hole being bored, collecting the separated drilling fluid in a settling tank and conveying the spoil to a designated location for collection or disposal thereof.

In this way, the invention provides for more efficient use of the drilling rig and eliminates the necessity of shoveling large amounts of spoil out of the settling tank.

BRIEF SUMMARY OF THE INVENTION

The invention provides a conveying apparatus including a conveyor working surface made up of a plurality of endless belts arranged in side-by-side relationship allowing for drilling fluid drainage between the belts and the conveying of spoil thereon. Other specific features of improvement relating to the invention will be described hereinbelow in connection with the detailed description of the preferred embodiment.

BRIEF DESCRIPTION OF THE DRAWINGS

FIG. 1 is a plan view of a conveyor apparatus according to the invention arranged in its operating position with respect to a settling tank and a well hole.

FIG. 2 is a sectional elevation taken along 2—2 of the plan view of FIG. 1.

FIG. 3 is a pictorial view in perspective of the apparatus of FIG. 1 in operating position with the drilling apparatus excluded for clarity.

FIG. 4 is a detail plan view of a section of the conveyor working surface.

FIG. 5 is a sectional view taken along lines 5—5 of FIG. 4.

FIG. 6 is a sectional auxiliary view taken along lines 6—6 of the sectional elevation shown in FIG. 2.

FIG. 7 is a detailed view of the input end of the conveyor, taken from FIG. 2.

FIG. 8 is a detail in perspective of the input end of the conveyor with the endless belts removed for clarity.

FIG. 10 is a detail in perspective of that portion of the conveyor shown in FIG. 9 with the endless belts removed for clarity and with the tensioning lock in the loose position.

FIG. 11 is a pictorial detail of a lower belt support utilized on the conveyor.

FIG. 12 is a detailed view of an upright conveyor support member and associated structure.

DETAILED DESCRIPTION OF INVENTION

Figure 9:
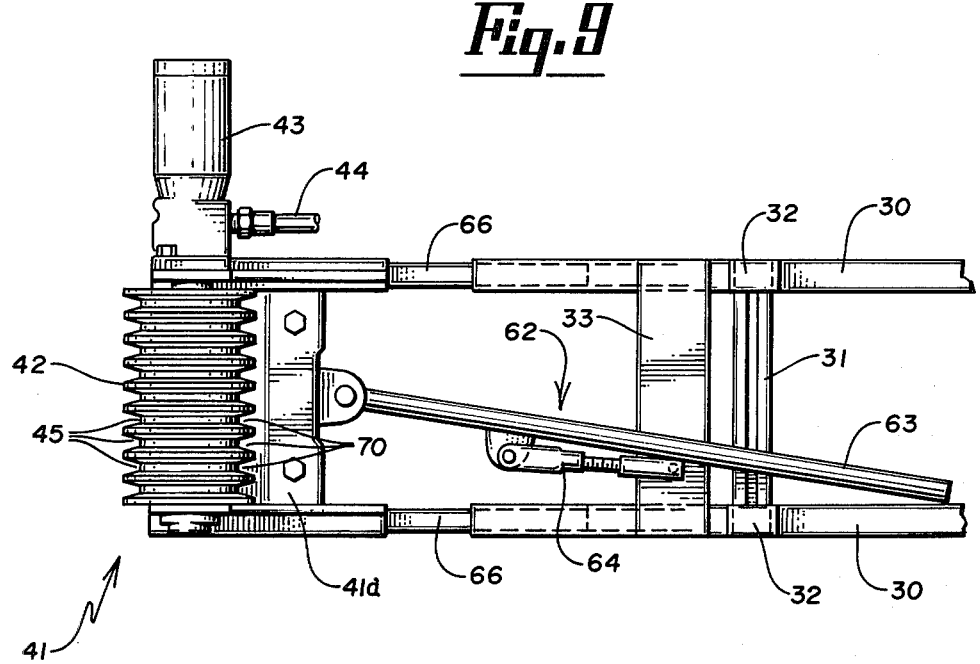
FIG. 9 is a bottom plan view of the output end of the conveyor with the endless belts removal for clarity and showing a tensioning lock arrangement in the tightened position.

In the drawing, like reference characters designate similar parts in the several views.

Referring now to the drawings and first most specifically to FIG. 2, an earth formation is shown at 10 having a hole 11 formed therein by the rotary drilling means or other drilling tool including drill pipe, casing and the like, all of which are illustrated schematically as 12 and which will include all of the related equipment such as a derrick, drilling fluid supply, hydraulic lift and the like as is normally associated with such drilling rigs and which are well known in the art but not explicitly shown in the Figure. In accordance with conventional practice, and as schematically shown in FIG. 2 by the arrows, drilling fluid is pumped into the well, usually through a drill pipe to the bottom of a hole being bored where it entrains the spoil formed by the boring operation and flushes it upwardly out of the hole as indicated by the arrows to be discharged at the earth's surface.

The spoil laden drilling fluid is discharged onto and is handled by the conveyor apparatus now to be described. For purposes of clarity, the rotary drilling means and other associated earth boring equipment is not shown in the remaining figures.

As shown in FIG. 2, the earth's surface provides support for a settling tank 13, the purpose of which is to collect drilling fluid following its separation from the spoil to allow for settling of finer spoil particles therefrom and recirculation of the drilling fluid.

For this purpose, settling tank 13 is provided at one end thereof with a collar 14 through which the earth boring apparatus 12 is inserted to bore hole 11. Collar 14 is provided with a discharge opening in the form of a notch 15 having a lip 15a over which spoil-laden drilling fluid is discharged from the hole being bored onto the conveyor of the invention, generally indicated at 16. The input end 17 of conveyor 16 is positioned at notch 15 under lip 15a for receiving the spoil-laden drilling fluid. Positioned to each side of conveyor 16 and to each side of notch 15 are a pair of gratings 18 preferably formed of stock steel sheet with drilled strain holes and a relatively smooth surface finish. Other screen-like gratings may be used. However, smooth stock with drilled holes is preferred since it allows for more convenient scraping of mud from the smooth surface thereof. The gratings when positioned as shown allow for drainage of drilling fluid into settling tank 13 and also serve as a means for guiding spoil and any remaining unseparated drilling fluid onto the working surface of conveyor 16 where further separation of the drilling fluid from the spoil occurs.

As drilling fluid falls into settling tank 13, primarily into portion 19, it tends to flow toward the other end of tank 13. This flow is slowed by separators 20 and 21. Separator 20 has a central opening 20a and separator 21 contains a plurality of openings 21a which serve to slow the flow of drainage fluid through the tank to allow for settling therefrom of finer particles of spoil such as sand, which the drilling fluid carries with it as it drains from the conveyor. Upon reaching end 22 of tank 13, the drilling fluid is collected by means of hoses 23 for recirculation into the hole being bored. Due to the improved design of the conveyor apparatus 16, minimal amounts of spoil, primarily of the finer variety, are collected in the settling tank 13. Consequently, there is little requirement for effort in removing spoil therefrom. As the drilling fluid flows from compartment 19 through intermediate compartment 24 and into end compartment 25, less and less spoil remains in the drilling fluid.

Conveyor 16 is comprised of a support structure which may include a pair of side rails 30, which are preferably of hollow cross section, the purpose of which will be described hereinbelow. Side rails 30 may be adapted as shown in FIG. 6 to support gratings 18. Side rails 30 are connected together by cross piece elements 31 which provide a rectangular support configuration with the side rails for the conveyor belts and drive means described further hereinbelow. Cross pieces 31 are preferably comprised of a low friction material such as nylon or polytetrafluoroethylene supported in brackets 32, as best seen in FIG. 8, which may be welded to side rails 30. Additional metal cross pieces 33 may be included at each end of the conveyor as shown in FIGS. 8 and 9 for additional strength and support. The purpose of the low friction cross members 31 which depend from the bottom of the side rails, as best shown in FIG. 2 and FIG. 8, is to aid in the movement of the conveyor belts during operation of the device when the spoil laden belt contacts the cross pieces.

Depending from side rails 30 at input end 17 of conveyor 16 are a pair of spaced, rounded support members 34 on the sides of the conveyor and upon which it rests on the bottom surface 35 of settling tank 13. Spaced support members 34 are best seen in FIGS. 7 and 8 and each includes a central cut-out support portion as shown in FIG. 7 for rotatably receiving and supporting a specially designed, vaned pulley means 36 for aiding and imparting movement to the conveyor belts. Quick assembly and disassembly of vaned pulley means 36 is provided for by means of pull-pins 29.

As shown in the Figures, vaned pulley means 36 includes several vanes 37 supported on a central rotary portion 38 for rotation in suitable bearing journals 39 and is similar to a paddle wheel in configuration. The vaned design of pulley means 36 is especially adapted for use at input end 17 of conveyor 16 at which location it is exposed to drilling fluid heavily laden with muddy spoil. This particular design of the pulley means 36 has been found to be eminently successful at avoiding clogging with mud and the like and allowing sustained operation of the conveyor without jamming of the pulley with mud. It is also, due to the open configuration of the vaned pulley means, possible to insert a rod or the like from either side of the conveyor to dislodge mud from between the vanes without disassembling the conveyor.

Also, there is connected to the input end 17 of the conveyor a receiving platform 40, supported thereby to overlie pulley means 36 and avoid direct loading of muddy spoil between vanes 37. Receiving platform 40 may alternatively be supported at lip 15a if desired. Preferably, vaned pulley means 36 functions as an idler, rotating when the conveyor belts are moved and the belts are driven by means at the other end or output end 41 of conveyor 16.

Output end 41 of conveyor 16 includes a specially designed drive pulley means 42. It is associated with drive mechanism 43, which preferably takes the form of a hydraulically driven motor, the hydraulic lines of which are shown in fragment at 44. As can be seen from the Figures, drive pulley means 42 is formed to include a series of circumferential and laterally spaced grooves or seats 45 particularly adapted as to cross-section configuration to receive a plurality of V-belts 46. Conventional, commercially available V-belts may be used for this purpose and are shown as to cross sectional configuration in FIG. 5. For example, Browning Super Gripbelt B315 belts, ⅜ inches wide and 7/16 inches thick, have been used very satisfactorily in one design. Belts 46 are arranged in side-by-side relationship, preferably with a slight drainage spacing therebetween, to provide a working surface for the conveyor 16 while allowing drainage therebetween for drilling fluid. The spacing will vary depending on the particle size of the spoil. A typical spacing is 1/8 inch. However, this will vary depending on the earth formation being worked and the type of ground involved also.

Preferably, cross connecting lengths 47 of V-belt or other material will be attached to belts 46 at spaced intervals as best seen in FIGS. 1, 2 and 4 to aid in maintaining predetermined spacing between belts 46 for uniform drainage purposes of drilling fluid through the working surface of the conveyor.

The configuration of drive pulley means 42 to provide for a plurality of spaced seats for the belts 46 in combination with the vaned pulley means 36 have been found to provide a unique combination for the purposes of this invention. That is, they provide for sustained operation of the conveyor belts without jamming, slipping or otherwise malfunctioning when the conveyor is carrying spoil and drilling fluid. It is to be understood that inevitably some drilling fluid is retained in the spoil as the spoil is carried to the output end of the conveyor. Consequently, slipping of belts 46 on drive pulley means 42 was found to be a problem until the combination shown was discovered and put into use.

Preferably, a lower belt support arrangement 50 will be included on the conveyor. Support 50 may include a pair of spaced runners 51 fixedly supported on a rocker 52, as by welding thereto. Rocker 52 is rotatably supported from depending arms 53 which are attached to side rails 30 of conveyor 16. The purpose of lower support 50 is to prevent whipping of belts 46 during operation of the conveyor and to provide support therefor.

Conveyor 16 is supported at end 22 of tank 13 by means of an upright support member 54 (best seen in FIGS. 2 and 12) which carries an adjustable bracket of any convenient design, preferably including a horizontal support member 55 upon which conveyor 16 is supported. Vertical support member 54 will preferably include a series of spaced holes 56 by means of which the elevation of conveyor 16 may be selectively adjusted as by relocating a pull-pin 57. Horizontal support member 55 may be a bracket member or the like fixedly attached to a sliding piece 55a which is slidably received on vertical member 54. The lower end of vertical support member 54 will preferably terminate in a shoe 58 which engages the upper edge of end portion 22 and may be slid from side to side of tank 13 to angularly position conveyor 16 over tank 13.

The conveyor may also be fitted with a centrally located hinged arrangement generally indicated at 60 to provide for folding conveyor 16 for convenience when the drill rig is being transported. Such an arrangement allows for conveyor 16 to be folded in half and carried in settling tank 13 for portability.

Preferably, conveyor 16 will also include a tensioning arrangement generally indicated at 62 for tensioning the conveyor belts 46. Tensioning arrangement 62 will preferably include a lever arm 63 rotatably attached to end portion 41 of conveyor 16 as to cross piece 41a. As can be seen from FIGS. 9 and 10 particularly, end portion 41 is slidably fitted into hollow side rails 30 in a telescoping arrangement whereby it may be adjustably moved in and out to lengthen or shorten the overall conveyor and thus tighten or loosen belts 46. Output end 41 of conveyor 16 is slidably fitted to side rails 66 which are fixedly carried in conveyor side rails 30. Attached to an intermediate portion of lever 63 and rotatably attached to conveyor cross piece 33 is lever arm 64 which is preferably adjustable in length, as shown. As can be seen from the Figures, rotation of lever arm 63 from one side of conveyor 16 to the other moves lever arm 64 from a locked and extended position as shown in FIG. 9 to an unlocked and loose position as shown in FIG. 10 whereby output end 41 of conveyor 16 and drive pulley means 42 may be positioned between tight and loose positions with respect to belts 46. The arrangement shown is an over center arrangement whereby lever arm 63 locks in either extreme position.

A plurality of fingers 70 may also be included as shown in FIG. 9 to extend into the grooves or seats of pulley 42 for removing mud therefrom as the pulley rotates.

While the mode of operation of the apparatus described hereinabove is believed to be obvious from the illustrations of the drawings and description of the parts, it is briefly outlined as follows. Tank 16 is positioned with collar 14 located in the area to be bored. Conveyor 16 is unfolded and the input end 17 is placed at lip 15a of notch 15 in collar 14 and the conveyor is placed on horizontal support 55 at the other end of the tank at a desired elevated position. With the belts 46 already in place lever 63 is placed in the extended position as shown in FIG. 9 to tighten belts 46. Gratings 18 are put into place and the rotary boring mechanism and associated parts are inserted to initiate the boring operation.

Upon the discharge of drilling fluid laden with spoil from the hole being bored, the conveyor is activated by hydraulic drive means 43 which rotates drive pulley 42 and the conveyor begins conveying spoil and drilling fluid over tank 13. Most of the drilling fluid will drain through gratings 18 and belts 46 at the lower end of the conveyor leaving a substantial amount of larger particle spoil to be carried to the output end of the conveyor where it falls off to be piled or received in any suitable conveyencing means for disposal.

While a preferred specific embodiment of the invention has been illustrated and described it is to be clearly understood that the invention is not to be limited to the exact construction, mechanisms and devices disclosed because various modifications of these details may be provided in putting the invention into practice.

Having described the preferred embodiments of the invention, the subject matter in which exclusive rights are claimed is defined as follows:

1. In an apparatus for boring holes in the earth, the apparatus including:
   (1) rotary boring means for boring a hole;
   (2) means for introducing drilling fluid to the boring area;
   (3) fixed wall structure surrounding the boring means for receiving spoil laden drilling fluid from a hole being bored, the wall structure having an opening for discharging the spoil-laden fluid, and
   (4) continuous conveyor means having an inlet end located at the opening in the wall structure for receiving the discharged spoil-laden drilling fluid;
   the improvement wherein the conveyor comprises
   (5) a plurality of V-type conveyor belts defining a conveyor working surface, the belts being arranged in side-by-side yet spaced apart relationship for allowing drilling fluid to drain therebetween while the belts carry the spoil away.

2. A conveyor for receiving drilling fluid laden with spoil from a drilling rig, the conveyor comprising a plurality of endless belts arranged in side-by-side relationship to provide a conveyor working surface allowing fluid drainage between the belts whereby the fluid is separated from the spoil and the spoil is conveyed on the working surface area over the length of the conveyor and wherein the endless belts are V-belt type.

3. The conveyor of claim 2 including a fingered pulley cleaning means fixedly disposed transversely adjacent the outlet end pulley with the fingers thereof extending into the pulley seats to provide a mud removing function upon rotation of the pulley.

4. A conveyor for receiving drilling fluid laden with spoil from a drilling rig, the conveyor comprising a plurality of endless belts arranged in side-by-side relationship to provide a conveyor working surface allowing fluid drainage between the belts whereby the fluid is separated from the spoil and the spoil is conveyed on the working surface area over the length of the conveyor, and wherein the belts are supported at the inlet and outlet ends of the conveyor by pulley means and the inlet-end pulley means comprises a multi-vaned paddelwheel-like structure supporting the belts on the vanes.

5. In an apparatus for boring holes in the earth, the apparatus including:
   (1) rotary boring means for boring a hole;

(2) means for introducing drilling fluid to the boring area;

(3) fixed wall structure surrounding the boring means for receiving spoil laden drilling fluid from a hole being bored, the wall structure having an opening for discharging the spoil-laden fluid, and (4) continuous conveyor means having an inlet end located at the opening in the wall structure for receiving the discharged spoil-laden drilling fluid; the improvement wherein the conveyor comprises (5) a plurality of conveyor belts defining a conveyor working surface, the belts being arranged in side-by-side relationship for allowing drilling fluid to drain therebetween while the belts carry the spoil away, and (6) apertured side-wall means extending between the fixed wall structure and the sides of the inlet-end of the conveyor for drilling fluid drainage and spoil retention on the conveyor.

6. The apparatus of claim 5 wherein the apertured side-wall means comprises bored sheet, the smooth surfaces thereof facilitating the scraping of mud therefrom.

7. A conveyor for receiving drilling fluid laden with spoil from a drilling rig, the conveyor comprising a plurality of endless belts arranged in side-by-side relationship to provide a conveyor working surface allowing fluid drainage between the belts whereby the fluid is separated from the spoil and the spoil is conveyed on the working surface area over the length of the conveyor, and including means for adjusting the tension of the belts comprising a telescoping belt-support structure the length of which is adjustable whereby the distance between the belt-carrying means may be adjusted between lengthened and shortened positions for adjusting the tension in the belts and further including means for locking the belt-support structure in the lengthened position for operation of the conveyor.

8. A conveyor for receiving drilling fluid laden with spoil from a drilling rig, the conveyor comprising a plurality of endless belts arranged in side-by-side relationship to provide a conveyor working surface allowing fluid drainage between the belts whereby the fluid is separated from the spoil and the spoil is conveyed on the working surface area over the length of the conveyor, and including hinge means for folding of the conveyor apparatus for storage and transportation.

* * * * *